US005693256A

United States Patent [19]
Sawicki et al.

[11] Patent Number: 5,693,256
[45] Date of Patent: Dec. 2, 1997

[54] FOAM CONTROL AGENT

[75] Inventors: George Christopher Sawicki, South Glamorgan, United Kingdom; Frank Andre Daniel Renauld, Chaumont-Gistoux; Jacqueline L'Hostis, Woluwe-Saint Lambert, both of Belgium

[73] Assignee: Dow Corning S.A., Seneffe, Belgium

[21] Appl. No.: 456,584

[22] Filed: Jun. 1, 1995

[30] Foreign Application Priority Data

Jun. 17, 1994 [GB] United Kingdom ............... 9412179

[51] Int. Cl.$^6$ .................................................. B01D 19/04
[52] U.S. Cl. ........................... 252/321; 252/358; 510/466
[58] Field of Search ............................ 252/321, 358; 510/466

[56] References Cited

U.S. PATENT DOCUMENTS

| 3,076,768 | 2/1963 | Boylan | 252/358 |
| 3,666,681 | 5/1972 | Keil | 252/358 |
| 3,673,108 | 6/1972 | Schutt | 252/411 |
| 3,697,439 | 10/1972 | Lieberman | 252/321 |
| 3,697,442 | 10/1972 | Lieberman | 252/321 |
| 3,730,907 | 5/1973 | Shane | 252/321 |
| 5,262,088 | 11/1993 | Hill et al. | 252/321 |

FOREIGN PATENT DOCUMENTS

| 1224026 | 3/1968 | European Pat. Off. | C08G 47/02 |
| 1505665 | 5/1975 | European Pat. Off. | C08L 83/12 |
| 0076558 | 6/1982 | European Pat. Off. | B01D 19/04 |
| 2155004A | 9/1985 | European Pat. Off. | B01D 19/04 |

OTHER PUBLICATIONS

Kirk–Othmer Encyclopedia of Chemical Technology, Fourth Edition, (John Wiley & Sons, NY, NY) pp. 928–937 & 944–945, 1993.

Encyclopedia of Polymer Science and Engineering, vol. 15, (John Wiley & Sons, NY, NY, copyright 1989) pp. 265–273 & 298–308, Jun. 1992.

*Primary Examiner*—Richard D. Lovering
*Assistant Examiner*—Daniel S. Metzmaier
*Attorney, Agent, or Firm*—Timothy J. Troy

[57] ABSTRACT

A foam control agent comprising 100 parts by weight of a water-insoluble organic liquid, from 0.1 to 20 parts by weight of a first hydrophobic filler with a size of no more than 20 µm, preferably silica, and from 0.1 to 20 parts by weight of a second hydrophobic filler having a size of at least 30 µm, preferably an organopolysiloxane resin, said fillers being insoluble in the organic liquid. The foam control agent is particularly useful as an antifoam in detergent compositions, paper pulp manufacture, textile dyeing or cutting oils.

18 Claims, No Drawings

FOAM CONTROL AGENT

The present invention relates to a foam control agent, and more particularly to a foam control agent which uses an organic water-insoluble liquid. More particularly the invention relates to a foam control agent which is based on organic oils and certain hydrophobic fillers and which is particularly suitable as an antifoam, i.e. a foam control agent which is capable of limiting the production of foam or inhibiting foam rather than of the abating of existing foam, though both actions can sometimes be accomplished with one and the same foam control agent.

Foam control agents which are based on water-insoluble organic liquids have been know for some time. Such foam control agents have fairly good efficiency, and are useful in a number of applications, e.g. as detergent antifoams and as process aids in textile or pulp manufacture. Examples have been described in GB 1 224 026 and U.S. Pat. No. 3,666,681.

In the former of the specifications, there is described a process for inhibiting foam formation in aqueous systems which comprises adding to the system before development of foam an antifoaming agent which is composed of 10 parts by weight of certain water-insoluble organic liquids and from 0.1 to 5.0 parts by weight of an organopolysiloxane which is compatible in the organic liquid and consists essentially of $SiO_2$ units and $R_3SiO_{1/2}$ units in which R is a monovalent hydrocarbon radical containing from 1 to 6 carbon atoms and in which the number ratio of $SiO_2$ units to $R_3SiO_{1/2}$ units is in the range from 0.6/1 to 1.2/1.

In the latter specification, there is described an antifoaming agent for aqueous systems consisting essentially of a mixture of 100 parts by weight of certain water-insoluble organic liquids, from 0.5 to 10.0 parts by weight of an organopolysiloxane compound which is selected from the group consisting of a hydroxyl end-blocked dimethylsiloxane fluid of a certain viscosity and a benzene-soluble organopolysiloxane resin consisting essentially of $SiO_2$ units and $R_3SiO_{1/2}$ units in which R is a monovalent hydrocarbon radical containing from 1 to 6 carbon atoms and in which the number ratio of $SiO_2$ units to $R_3SiO_{1/2}$ units is in the range from 1.2/1 to 0.6/1 and from 0.5 to 10.0 parts by weight of a filler which is a member selected from the group consisting of finely divided silica and methylsilsesquioxane gel, and from 0.002 to 5.0 parts by weight of a compound which is a member selected from the group consisting of ammonia, a disilazane and a compound of the formula R'OH in which R' is an alkali or alkaline earth metal. As the examples and some of the text only refers to organopolysiloxane resins wherein the number ratio of $R_3SiO_{1/2}$ units to $SiO_2$ units is in the range from 1.2/1 to 0.6/1, it is thought that this is the ratio intended throughout the specifications.

We have now found that if a mixture of hydrophobic fillers is used having different average particle sizes, an improved foam control agent with antifoaming capacities is obtained.

According to the invention there is provided a foam control agent comprising 100 parts by weight of (A) a water-insoluble organic liquid, (B) from 0.1 to 20 parts by weight of a first hydrophobic filler having an average particle size of no more than 20 µm and (C) 0.1 to 20 parts by weight of a second hydrophobic filler having an average particle size of at least 30 µm said hydrophobic fillers (B) and (C) being insoluble in the water-insoluble organic liquid (A).

Water-insoluble organic liquids (A) may be any suitable and known material which preferably has an aromatic content of less than 10% by weight of the liquid or it may be a mixture of one or more such liquids, which liquid or mixture of liquids is not a solvent for filler (B) or filler (C). It has to be a liquid material at the operating temperature of the foam control agent. In preferred foam control agents, the organic liquid is liquid at 25° C. Suitable organic liquids include oils, e.g. mineral oils, isoparaffinic oils, vegetable oils, polyoxypropylene glycols, polyoxybutylene glycols, esters of carboxylic acids and monohydric alcohols, higher carboxylic acids and higher alcohols. Examples of such suitable organic liquids include white oils, mineral oil, dioctyl phthalate, diethyl succinate, methyl caproate, butyl pelargonate, ethyl stearate, dodecyl laurate, methyl melissate, decyl alcohol, octadecyl alcohol, stearic acid, myristic acid, peanut oil, coconut oil, olive oil, cottonseed oil and linseed oil. Preferred organic liquids however are oils, particularly mineral oil or vegetable oil and especially hydrogenated mineral oil. These oils are preferred for their relative low cost, their availability, and mostly because they do not dissolve the preferred hydrophobic fillers (C) which are to be used, as will be described below.

The first hydrophobic filler (B) is to be a filler which is insoluble in the organic liquid and which has an average particle size of no more than 20 µm. The particle size which is defined for the fillers in foam control agents according to the present invention, is measured when the particle is dispersed in the liquid (A), and not e.g. as given by the manufacturer of the filler ( e.g. silica where silica is used as the filler). Hydrophobic fillers for foam control agents are well known and have been described in many patent specifications. They may be such materials as silica, titania, ground quartz, silicone based resins, ethylene alkylamides, e.g. ethylene bis stearylamide, organic waxes e.g. polyethylene waxes and microcrystalline waxes.

Two important criteria need to be fulfilled for the filler to be acceptable as filler (B) in the foam control agent according to the invention. These conditions are the average particle size as measured when dispersed in liquid (A) and the insolubility of the filler in organic liquid (A). The former can be measured e.g. by use of a suitable microscope. The latter can be easily tested prior to use, e.g. by merely mixing some of the filler with some of the organic liquid (A). The mixture must be heterogeneous for the solubility condition to be fulfilled. Some degree of solubility can be tolerated, but this should not be higher than about 1 part by weight of filler for every 100 parts by weight of the organic liquid (A) at a temperature of 25° C., more preferably at the operating temperature of the foam control agent according to the invention.

Some of the fillers mentioned above are not hydrophobic in nature, but can be used if made hydrophobic. This could be done either in situ (i.e. when dispersed in the organic liquid (A)), or by pre-treatment of the filler prior to mixing with liquid (A). Methods of making fillers hydrophobic are well known to the person skilled in the art of foam control agents, and have been des-cribed in a number of publications.

It is preferred that the first filler (B) is ethylene bis stearylamide, polyethylene wax, or more preferably a silica which is made hydrophobic. This can be done e.g. by treatment with a fatty acid, but is preferably done by the use of methyl substituted organosilicon materials. Suitable hydrophobing agents include polydimethylsiloxanes, dimethylsiloxane polymers which are end-blocked with silanol or silicon-bonded alkoxy groups, hexamethyldisilazane, hexamethyldisiloxane and organosilicon resins consisting of monovalent groups $(CH_3)_3SiO_{1/2}$ and tetra-valent groups $SiO_2$ in a ratio of from 0.5/1 to 1.1/1.

Preferred silica materials are those which are prepared by precipitation or by gel-formation, although other types of silica e.g. fumed silica, are also acceptable. It is particularly preferred to use silica fillers which have an average particle size of from 2 to 18 µm, most preferably from 5 to 15 µm. Such materials are well known and are commercially available, both in hydrophilic form and in hydrophobic form.

The second filler (C) must also be a filler which is insoluble in the organic liquid (A) but must have an average particle size of at least 30 µm. Such hydrophobic fillers are also well known. They may be similar materials to those described for filler (B), except for their particle size. The same criterion of insolubility needs to be fulfilled for the filler to be acceptable as filler (C) in a foam control agent according to the invention as was the case for filler (B). It is preferred that the second filler (C) is a siloxane resin consisting of monovalent trihydrocarbonsiloxy (M) groups of the formula $R_3SiO_{1/2}$ and tetrafunctional (Q) groups $SiO_{4/2}$, wherein R denotes a monovalent hydrocarbon group, preferably an alkyl group the number ratio of M groups to Q groups is in the range 0.5:1 to 1.1:1, more preferably 0.6:1 to 0.8:1. Although it is most preferred that filler (C) consists only of monovalent and tetravalent siloxy units as defined above, it is also acceptable that up to 20% of all units present are divalent units $R_2SiO_{2/2}$ or trivalent $RSiO_{3/2}$ units. R is preferably an alkyl group, but other hydrocarbon units may also be present, e.g. alkenyl units, preferably in small amounts, most preferably not exceeding 5% of all R units. The group R is preferably an alkyl group having from 1 to 6 carbon atoms, most preferably methyl or ethyl. It is particularly preferred that at least 80% of all R groups present are methyl groups, and even more preferably substantially all R groups are methyl groups. Small amounts of silicon bonded hydroxyl groups may however also be present. Such siloxane resins are well known and their manufacture has been described in many publications. They can be made in solvent or in situ, e.g. by hydrolysis of certain silane materials. Particularly preferred is the hydrolysis and condensation in the presence of a solvent e.g. xylene of a precursor of the tetravalent siloxy unit (e.g. tetraorthosilicate, tetraethyl orthosilicate, polyethyl silicate or sodium silicate) and a precursor of monovalent trialkylsiloxy units (e.g. trimethylchlorosilane, trimethylethoxysilane, hexamethyldisiloxane or hexamethyldisilazane).

It is particularly preferred that siloxane resins used as filler (C) are materials with an average particle size, as measured when dispersed in liquid (A) of from 30 to 400 µm, more preferably 50 to 200 µm. Even though the materials may be prepared as a solution, they will form solid particles with an acceptable particle size by mixing the solution with a water-insoluble liquid (A) in which they are insoluble. The level of insolubility of preferred filler (C) in organic liquid (A) will to some extent affect the particle size of the filler. The lower the solubility of the siloxane resins in organic liquid (A), the larger the particle size tends to be when the resin is mixed as a solution into the organic liquid (A). Thus a siloxane resin which is soluble at 1% by weight in organic liquid (A) will tend to form smaller particles than a resin which is only soluble at 0.01% by weight at the same temperature.

Apart from the three ingredients mentioned as essential ingredients in the foam control agent, other conventional additives may also be included in foam control agents according to the invention. Such additives include adjusting agents for density, preservatives, thickening agents, surfactants, alcohols, especially fatty alcohols, viscosity modifiers, colorants and others. If desired other oils e.g. silicone oils may also be added, but this is not preferred, as it would increase the cost of the foam control agent without the guarantee of commensurate improvement in performance. Other additional ingredients in the foam control agent could include hydrophobic fillers which have an average particle size of from 20 to 30 µm or hydrophobic fillers which are soluble in the organic liquid (A), but these are preferably not present and should definitely not be present in quantities which exceed those of the other fillers (B) and (C).

The amount of fillers (B) and (C) which may be used in the foam control agents according to the invention may be up to 20 parts by weight of each of the fillers for every 100 parts by weight of organic liquid (A). The weight ratio of filler (B) to filler (C) is preferably in the range from 1:10 to 10:1, more preferably 1:5 to 5:1, most preferably 1:2 to 2:1. The total amount of fillers (B) and (C) which are to be used in foam control agents according to the invention are in the range of from 0.2 to 40 parts by weight for every 100 parts of organic liquid (A). More preferably they are present in amounts of from 2 to 20 parts, most preferably 8 to 15 parts.

Foam control agents according to the invention may be made by merely mixing the ingredients together using suitable mixing or homogenising equipment. The order of mixing the ingredients is not critical, although it is preferred to add the first and second filler to the liquid and disperse them by mixing, rather than adding the liquid to the fillers. When first filler is made hydrophobic in situ (i.e. when dispersed in the liquid (A)), it is important that filler (C) is not added till the hydrophobing has taken place.

If either of fillers (B) or (C) is added in solvent, it is possible to remove the solvent before using the foam control agent, but this is not necessary. With the preferred first filler (B), i.e. silica, it is most preferred that it is rendered hydrophobic prior to addition to the organic liquid. With the preferred second filler (C), i.e. organosiloxane resin, it is most preferred that it is prepared in a solvent, which may be an aromatic or aliphatic solvent, e.g. xylene, toluene or isoparaffinic oil. Once prepared, the fillers (B) and (C) may be added separately or after having been mixed together. Because the fillers are not soluble in the organic liquid (A), the presence of a solvent for filler (C) will no longer suffice to keep the preferred filler (C) in solution, and it will precipitate forming a particle with an average particle size of more than 30 µm. The amount of solvent used is preferably kept at the minimum required level in most cases, in order to avoid the presence of components which may not contribute to the efficiency of the foam control agent. However, some solvent may be used in order to better control the particle size of preferred siloxane resin particles (C), as this may vary the solubility of filler (C) in the mixture of liquid (A) and the solvent even if solubility in liquid (A) is as required.

The foam control agents according to the invention may be used for a number of applications e.g. in processes where foam generation is to be limited or avoided altogether. Foam control agents according to the invention are particularly useful in those applications where prior art foam control agents based on organic water-insoluble liquids have been used. These appli-cations include detergent foam control, e.g. in powdered detergents, foam control in the paper pulp industry, cutting oils and foam control in textile dyeing baths.

There now follow a number of examples which illustrate the invention and show its advantage over comparative examples using prior art technology. All parts and percentages used are by weight unless otherwise indicated.

EXAMPLE A

The following illustrative (Examples 1 to 6) and comparative (Examples C1 to C8) foam control agents were prepared by mixing x parts of organic liquid (A) with y parts of filler (B) and z parts of filler (C). Details of (A), (B), (C), x, y and z are given in Table I below. Component (B) was added to Component (A), stirred till the dispersion was reasonably uniform and then Component (C) was added, and the mixture stirred till well dispersed with a high shear mixing device. Kaydol® is a white mineral oil, supplied by Witco, Sipernat® D10 is a hydrophobic precipitated silica, supplied by Degussa and EBSA denotes ethylene bis stearylamide, whereas mineral oils 1 and 2 are oils used in commercially available foam control agents. Filler (C) where used is a MQ resin where M denotes a trimethylsiloxy unit and Q denotes a $SiO_2$ unit. The M/Q ratio is given as the number of M units for every Q unit in the filler.

TABLE I

| Example | (A) | (B) | (C) | x | y | z |
|---|---|---|---|---|---|---|
| 1 | Kaydol® | Sipernat®D10 | $M_{0.65}Q$ | 90 | 5 | 5 |
| 2 | Kaydol® | Sipernat®D10 | $M_{0.5}Q$ | 90 | 5 | 5 |
| 3 | min. oil 1 | EBSA | $M_{0.65}Q$ | 90 | 5 | 5 |
| 4 | min. oil 2 | EBSA | $M_{0.65}Q$ | 90 | 5 | 5 |
| 5 | rapeseed | Sipernat®D10 | $M_{0.65}Q$ | 90 | 5 | 5 |
| 6 | peanut | Sipernat®D10 | $M_{0.65}Q$ | 90 | 5 | 5 |
| C1 | Kaydol® | Sipernat®D10 | — | 95 | 5 | — |
| C2 | Kaydol® | Sipernat®D10 | $M_{2.3}Q$ | 90 | 5 | 5 |
| C3 | Kaydol® | Sipernat®D10 | $M_{1.5}Q$ | 90 | 5 | 5 |
| C4 | Kaydol® | Sipernat®D10 | $M_{1.15}Q$ | 90 | 5 | 5 |
| C5 | mineral 1 | EBSA | — | 95 | 5 | — |
| C6 | mineral 2 | EBSA | — | 95 | 5 | — |
| C7 | rapeseed | Sipernat®D10 | — | 95 | 5 | — |
| C8 | peanut | Sipernat®D10 | — | 95 | 5 | — |

Foam control efficiency was evaluated in a front-loading washing machine Miele® 427 by washing a 3.5 kg load of clean cotton pillow cases at either a standard 95° C. wash cycle or a standard 40° C. wash cycle, using either 100 g of a commercial washing powder without a foam control agent, based on a mixture of anionic and nonionic surfactants (Detergent COM) or a mixture of 10.9 g of sodium dodecylbenzene sulphonate, 2.1 g of Dobanol® 45-7, 25 g of sodium perborate and 30 g of sodiumtripolyphosphate (Detergent EXP). The foam control efficiency was measured by investigating the amount of foam control agent which was required to maintain the foam level below the top of the window in the door of the washing machine when the drum was stationary, during the complete wash cycle. Results are given in Table II below.

TABLE II

Foam control agent required in detergent

| Example | Detergent | Wash Cycle | % required |
|---|---|---|---|
| 1 | EXP | 40° C. | 0.23 |
| 1 | COM | 95° C. | 0.4 |
| 2 | COM | 95° C. | 0.6 |
| 5 | EXP | 40° C. | 0.35 |
| 5 | EXP | 95° C. | 0.20 |
| 6 | EXP | 40° C. | 0.35 |
| 6 | EXP | 95° C. | 0.20 |
| C1 | EXP | 40° C. | 0.65 |
| C1 | COM | 95° C. | 0.7 |

TABLE II-continued

Foam control agent required in detergent

| Example | Detergent | Wash Cycle | % required |
|---|---|---|---|
| C2 | COM | 95° C. | >>0.7 |
| C3 | COM | 95° C. | >>0.7 |
| C4 | COM | 95° C. | >>0.7 |
| C7 | EXP | 40° C. | 0.65 |
| C7 | EXP | 95° C. | 0.40 |
| C8 | EXP | 40° C. | 0.65 |
| C8 | EXP | 95° C. | 0.35 |

It is clear from the results that the foam control agents according to the invention perform better than those of the prior art. Soluble Fillers (C) are less effective than insoluble fillers (e.g. C2, C3, C4 compared to 1).

Additional tests to evaluate the foam control ability were carried out by using a pump test procedure, consisting of recirculating 1000 ml of a cutting oil solution (5% of Biosol® as supplied by Castrol, in water) in a graduated cylindrical vessel for 3 hours at 25° C. The level of foam is monitored every 30 minutes and is expressed in ml of foam as measured in the cylindrical vessel. As can be seen from the test results given in Table III below, foam control agents according to the invention are able to control the amount of foam generated over a longer period of time at a lower concentration than foam control agents according to the prior art.

TABLE III ml of foam produced in function of time

| Example | % used | Time in minutes | | | | | |
| | | 0 | 30 | 60 | 90 | 120 | 150 | 180 |
|---|---|---|---|---|---|---|---|---|
| 1 | 0.08 | 0 | 150 | 150 | 150 | 150 | 250 | 300 |
| 3 | 0.08 | 0 | 100 | 100 | 100 | 200 | 200 | 350 |
| 4 | 0.08 | 0 | 50 | 50 | 100 | 200 | 200 | 300 |
| 5 | 0.08 | 0 | 150 | 150 | 150 | 200 | 200 | 400 |
| C1 | 0.26 | 0 | 100 | 150 | 200 | 200 | 250 | 300 |
| C5 | 0.19 | 0 | 0 | 0 | 0 | 100 | 300 | 400 |
| C6 | 0.20 | 0 | 50 | 100 | 150 | 200 | 300 | 400 |
| C7 | 0.20 | 0 | 50 | 50 | 200 | 300 | 400 | 400 |

EXAMPLE B

Foam control agents according to the invention were prepared by mixing together 90 parts of a mixture of mineral oil and octyl stearate, 5 parts of a hydrophobic silica Sipernat® D10 (having an average particle size below 20 µm) and parts of an organosiloxane resin having monovalent trimethylsiloxane (M) units and tetravalent siloxane (Q) units in a ratio of 0.65 M units for every Q unit. The resin was prepared in octyl stearate, in which it is soluble and the amount used was chosen to enable different particle size resins to be formed. The foam control agents were then tested for their efficiency in a front-loading washing machine Miele® 427 by washing a 3.5 kg load of clean cotton pillow cases at a standard 95° C. wash cycle, using a mixture of 10.9 g of sodium dodecylbenzene sulphonate, 2.1 g of Dobanol® 45-7, 25 g of sodium perborate and 30 g of sodium-tripolyphosphate and 0.2 g of the foam control agent. The foam control efficiency was determined by measuring the amount of foam generated as measured in the window in the door of the washing machine when the drum was stationary, during the complete wash cycle. The foam height was measured at regular intervals, and is expressed as a percentage of the window covered with foam. Table IV gives the foam height during the wash cycle in function of the particle size of the siloxane resin (P.S. given in µm). It can be seen that larger particles give a better foam control.

TABLE IV

Efficiency in function of particle size of (C)

| P.S. | Time in minutes | | | | | | | | |
|---|---|---|---|---|---|---|---|---|---|
| | 0 | 10 | 20 | 30 | 35 | 40 | 45 | 50 | 55 |
| <5 | 0 | 0 | 50 | 90 | 100 | 100 | 100 | 100 | 100 |
| 10–35 | 0 | 0 | 0 | 10 | 10 | 30 | 50 | 50 | 70 |
| 20–150 | 0 | 0 | 0 | 0 | 0 | 0 | 0 | 10 | 10 |
| 100–300 | 0 | 0 | 0 | 0 | 0 | 0 | 0 | 10 | 10 |

EXAMPLE C

A commercial foam control agent (PC) for use in paper pulp mills was used as a comparative test. To this foam control agent was added 5% by weight of a $M_{0.65}Q$ resin to form a foam control agent according to the invention (P). Both agents were tested using a pump test procedure, consisting of recirculating 1000 ml of black liquor at 80° C. in a graduated cylindrical vessel. The level of foam is allowed to reach 1000 ml, at which the foam control agent is added at the level indicated (in ppm). Foam levels are then monitored for 3 minutes and the level expressed in ml of foam as measured in the cylindrical vessel. As can be seen from the test results given in Table V below, a foam control agent according to the invention is better able to control the amount of foam generated at a lower concentration than the foam control agent according to the prior art.

TABLE V ml of foam produced in function of time

| Example | ppm | Time in seconds | | | | | | |
|---|---|---|---|---|---|---|---|---|
| | | 0 | 15 | 40 | 50 | 60 | 80 | 160 |
| P | 0.10 | 1000 | 500 | 500 | 600 | 700 | 800 | 1000 |
| PC | 0.20 | 1000 | 800 | 1000 | 1000 | 1000 | 1000 | 1000 |

That which is claimed is:

1. A foam control agent comprising (A) 100 parts by weight of a water-insoluble organic liquid, (B) from 0.1 to 20 parts by weight of a first hydrophobic filler having an average particle size of no more than 20 µm and is selected from the group consisting of silica, titania, ground quartz, silicone resins, ethylene alkylamide, and organic wax; (C) 0.1 to 20 parts by weight of a second hydrophobic filler having an average particle size of 30 to 400 µm and is a siloxane resin consisting of monovalent trisiloxy groups having the formula $R_3SiO_{1/2}$ and tetravalent siloxy groups having the formula $SiO_{4/2}$, wherein R represents an alkyl group; said hydrophobic fillers (B) and (C) being insoluble in the water-insoluble organic liquid (A).

2. A foam control agent according to claim 1, wherein organic liquid (A) is a liquid material at the operating temperature of the foam control agent.

3. A foam control agent according to claim 1, wherein organic liquid (A) is selected from the group consisting of mineral oil, vegetable oil and fatty acid ester.

4. A foam control agent according to claim 1, wherein first hydrophobic filler (B) is selected from the group consisting of silica, ethylene bis stearylamide and polyethylene wax.

5. A foam control agent according to claim 1, wherein hydrophobic filler (B) is a precipitated silica.

6. A foam control agent according to claim 1, wherein filler (B) has an average particle size of from 5 to 20 µm.

7. A foam control agent according to claim 1, wherein the ratio of monovalent groups to tetravalent groups is from 0.5:1 to 1.1:1.

8. A foam control agent according to claim 1, wherein R is methyl.

9. A foam control agent according to claim 1, wherein filler (C) has an average particle size of from 50 to 200 µm.

10. A foam control agent according to claim 1, wherein fillers (B) and (C) are present in a weight ratio of from 1:10 to 10:1.

11. A foam control agent according to claim 1, wherein fillers (B) and (C) are present in a weight ratio of from 1:2 to 2:1.

12. A foam control agent according to claim 1, wherein the total amount of fillers (B) and (C) is from 8 to 15 parts by weight for every 100 parts of organic liquid (A).

13. A method of making a foam control agent comprising (I) rendering 0.1 to 20 parts of a first hydrophobic filler having an average particle size of no more than 20 µm hydrophobic, said first hydrophobic filler selected from the group consisting of silica, titania, ground quartz, silicone resins, ethylene alkylamide, and organic wax; and (II) mixing (A) 100 parts by weight of a water-insoluble organic liquid with (B) 0.1 to 20 parts of a first hydrophobic filler and (C) 0.1 to 20 parts by weight of a second hydrophobic filler having an average particle size of 30 to 400 µm and is a siloxane resin consisting of monovalent trisiloxy groups having the formula $R_3SiO_{1/2}$ and tetravalent siloxy groups having the formula $SiO_{4/2}$, wherein R represents an alkyl group; said hydrophobic fillers (B) and (C) being insoluble in the water-insoluble organic liquid (A).

14. A method according to claim 13, wherein the method further comprises adding filler (C) as a solution in a solvent to the foam control agent wherein the solvent is selected from the group consisting of xylene, octyl stearate, isoparaffinic oil and mixtures of at least two of said solvents.

15. A process of controlling foam in a detergent composition, which includes adding a foam control agent to the detergent composition, the improvement comprising using as the foam control agent a foam control agent according to claim 1.

16. A process of controlling foam in paper pulp manufacture which includes adding a foam control agent to paper pulp, the improvement comprising using as the foam control agent a foam control agent according to claim 1.

17. A process of controlling foam in a textile dyeing process which includes adding a foam control agent to a dyeing bath, the improvement comprising using as the foam control agent a foam control agent according to claim 1.

18. A process of controlling foam in a process using cutting oil which includes adding to the cutting oil a foam control agent the improvement comprising using as the foam control agent a foam control agent according to claim 1.

* * * * *